(12) United States Patent
Inoue

(10) Patent No.: US 11,115,146 B2
(45) Date of Patent: Sep. 7, 2021

(54) OPTICAL SIGNAL DEMULTIPLEXING DEVICE, OPTICAL SIGNAL RECEPTION DEVICE, AND OPTICAL SIGNAL DEMULTIPLEXING METHOD

(71) Applicant: NEC Corporation, Tokyo (JP)

(72) Inventor: Takanori Inoue, Tokyo (JP)

(73) Assignee: NEC CORPORATION, Tokyo (JP)

( * ) Notice: Subject to any disclaimer, the term of this patent is extended or adjusted under 35 U.S.C. 154(b) by 61 days.

(21) Appl. No.: 16/498,106

(22) PCT Filed: Jan. 16, 2018

(86) PCT No.: PCT/JP2018/000983
§ 371 (c)(1),
(2) Date: Sep. 26, 2019

(87) PCT Pub. No.: WO2018/179686
PCT Pub. Date: Oct. 4, 2018

(65) Prior Publication Data
US 2021/0105080 A1 Apr. 8, 2021

(30) Foreign Application Priority Data
Mar. 31, 2017 (JP) .............................. JP2017-070502

(51) Int. Cl.
*H04J 14/02* (2006.01)

(52) U.S. Cl.
CPC ...... *H04J 14/0212* (2013.01); *H04J 14/0209* (2013.01)

(58) Field of Classification Search
None
See application file for complete search history.

(56) References Cited

U.S. PATENT DOCUMENTS

| 7,480,459 B2 * | 1/2009 | Nakamura | H04J 14/02 |
| | | | 398/82 |
| 2002/0028039 A1 | 3/2002 | Lee et al. | |

(Continued)

FOREIGN PATENT DOCUMENTS

| CN | 102725981 A | 10/2012 |
| EP | 2 790 341 A1 | 10/2014 |

(Continued)

OTHER PUBLICATIONS

Communication dated Jul. 3, 2020 from the China National Intellectual Property Administration in Application No. 201880021569.2.

(Continued)

*Primary Examiner* — Darren E Wolf
(74) *Attorney, Agent, or Firm* — Sughrue Mion, PLLC

(57) ABSTRACT

A branch units branches an optical signal by the number of wavelength intervals. Each band division unit generates a band division signal in which a signal band is divided into N division bands and an odd channel and an even channel are separated from each other. Multiplexing units multiplex band division signals of the same signal band, and branch means output the multiplexed signal to an optical receiver. A control unit controls the wavelength selective switch included in the band division units based on information indicating a signal arrangement of the signals in the respective wavelength intervals, thereby causing a signal of a signal band in which a signal of a corresponding wavelength interval is present to be included in each band division signal.

9 Claims, 15 Drawing Sheets

(56) References Cited

U.S. PATENT DOCUMENTS

| | | | |
|---|---|---|---|
| 2003/0215233 A1 | 11/2003 | Tomofuji et al. | |
| 2004/0252996 A1* | 12/2004 | McNicol | H04J 14/0224 398/79 |
| 2006/0062577 A1* | 3/2006 | Miura | H04J 14/0212 398/82 |

FOREIGN PATENT DOCUMENTS

| | | |
|---|---|---|
| JP | 2006-086920 A | 3/2006 |
| JP | 2006-254154 A | 9/2006 |
| JP | 2012-023781 A | 2/2012 |
| JP | 2012-039659 A | 2/2012 |
| JP | 2012-178771 A | 9/2012 |

OTHER PUBLICATIONS

Communication dated Apr. 1, 2020 from European Patent Office in EP Application No. 18776181.2.
International Search Report for PCT/JP2018/000983 dated Apr. 10, 2018 (PCT/ISA/210).
Chinese Office Action for CN Application No. 201880221569.2 dated on Nov. 24, 2020 with English Translation.

* cited by examiner

OPTICAL SIGNAL DEMULTIPLEXING DEVICE, OPTICAL SIGNAL RECEPTION DEVICE, AND OPTICAL SIGNAL DEMULTIPLEXING METHOD

CROSS REFERENCE TO RELATED APPLICATIONS

This application is a National Stage of International Application No. PCT/JP2018/000983 filed Jan. 16, 2018, claiming priority based on Japanese Patent Application No. 2017-070502 filed Mar. 31, 2017, the disclosure of which is incorporated herein in its entirety by reference.

TECHNICAL FIELD

The present disclosure relates to an optical signal demultiplexing device, an optical signal reception device, an optical signal transmission/reception device, and an optical signal demultiplexing method, and more specifically, to an optical signal demultiplexing device, an optical signal reception device, an optical signal transmission/reception device, and an optical signal demultiplexing method for demultiplexing an optical signal from a signal in which optical signals having a plurality of wavelengths different from one another are multiplexed at wavelength intervals different from one another.

BACKGROUND ART

A wavelength division multiplexing (WDM) transmission system in which light beams having a plurality of wavelengths different from one another are multiplexed and the obtained multiplexed signal is transmitted in an optical communication system has been known. In the WDM transmission system, wavelength intervals different from one another may be applied in accordance with a distance of a transmission path and characteristics of the transmission path. As a result, in the WDM transmission system, it is possible that a plurality of wavelength intervals different from one another may be mixed in one optical transmission path. In this case, the optical signal needs to be separated at an appropriate wavelength interval for each wavelength. Further, in a case in which a wavelength interval of one wavelength or one wavelength band is changed during a system operation as well, it is required to separate the optical signal at an appropriate wavelength interval in accordance with the change in the wavelength interval.

An optical branch insertion multiplexing device configured to branch a desired optical signal from a WDM signal in which a plurality of optical signals are multiplexed at wavelength intervals different from one another and insert the optical signal into the WDM signal is disclosed in Patent Literature 1. FIG. 15 shows the optical branch insertion multiplexing device disclosed in Patent Literature 1. In an optical branch insertion multiplexing device 200, an optical coupler 201 and wavelength selective switches (WSSs) 202 to 204 compose a dropping part for dropping an optical signal from an optical transmission path 220, and an optical coupler 210 and WSSs 212 to 214 compose an adding part for inserting (adding) an optical signal to the optical transmission path 220.

In this example, the optical transmission path 220 transmits a WDM signal in which optical signals whose channel intervals are 200 GHz, 100 GHz, and 50 GHz are multiplexed. The channel interval of 200 GHz is used when transmission is performed at a transmission speed of 100 Gbps (bit per second) per wave. Further, the channel interval of 100 GHz is used when transmission is performed at a transmission speed of 40 Gbps per wave, and the channel interval of 50 GHz is used when transmission is performed at a transmission speed of 10 Gbps per wave.

The optical coupler 201 branches the WDM signal into the WSSs 202 to 204 for dropping and a wavelength blocker (WB) 221. The WSS 202, which is a wavelength selective switch that corresponds to the optical signal in which channels are arranged at intervals of 200 GHz, is configured to separate the signal light by a unit of optical frequency band of 200 GHz and select each of the separated signal light beams for switching. In a similar way, the WSS 203 is a wavelength selective switch that corresponds to an optical signal in which channels are arranged at intervals of 100 GHz, and the WSS 204 is a wavelength selective switch that corresponds to the optical signal in which the channels ae arranged at intervals of 50 GHz. The WSSs 203 and 204 are used to drop optical signals of specific channels to transponders 205 to 207.

Each of the WSSs outputs the optical signal of the corresponding transmission speed (channel interval) to the transponder that corresponds to each transmission speed. More specifically, the WSS 202 outputs an optical signal having a channel interval of 200 GHz to the transponder 205 that corresponds to 100 Gbps. The WSS 203 outputs an optical signal having a channel interval of 100 GHz to the transponder 206 that corresponds to 40 Gbps. The WSS 204 outputs an optical signal having a channel interval of 50 GHz to the transponder 207 that corresponds to 10 Gbps.

The wavelength blocker 221 includes a function of adjusting the level of the signal light having any wavelength at intervals of 25 GHz. The wavelength blocker 221 blocks the wavelength band of the signal light dropped using the WSSs 202 to 204 and transmits the light beams of other wavelength bands to the optical coupler 210. The WDM signal that has transmitted through the wavelength blocker 221 is input to the optical coupler 210.

In the optical branch insertion multiplexing device 200, the operation in the adding part is similar to that of the dropping part except that the direction of the optical signals is opposite. The transponders 215 to 217 that correspond to the respective transmission speeds output optical signals to the WSSs 212 to 214 of the respective channel intervals, respectively. The optical coupler 210 multiplexes the optical signals output from the respective WSSs 212 to 214 and the optical signal output from the wavelength blocker 221.

CITATION LIST

Patent Literature

[Patent Literature 1] Japanese Unexamined Patent Application Publication No. 2012-23781

SUMMARY OF INVENTION

Technical Problem

As described above, the current optical communication system has been expanded its transmission capacity by collectively transmitting and receiving signals having wavelengths different from one another using the wavelength multiplexing technology. The mainstreams of wavelength intervals that have been employed in the current optical transmission system are 50 GHz or 37.5 GHz. Employment of a wavelength interval of 33.3 GHz (100/3 GHz) which is narrower than the above ones in the future has been under discussion.

In general, it has been known that, as a wavelength interval of a signal becomes narrower, this signal is affected by adjacent signals and the transmission quality of this signal is degraded. In the optical communication system, an appropriate wavelength interval is selected in accordance with a transmission distance. Further, wavelengths connecting links different from one another are often transmitted in one fiber using recent Optical add-drop multiplexer (OADM) technology, and wavelength multiplexed signals having wavelength intervals different from one another may be transmitted and received in one transmission/reception end. In this case, in the transmission/reception end, it is required to appropriately multiplex/demultiplex the wavelength multiplexed signals having different wavelength intervals and send the multiplexed/demultiplexed signal to the transmission path or the receiver.

Regarding multiplexing/demultiplexing of wavelength multiplexed signals having different wavelength intervals, in a general configuration, a multiplexing/demultiplexing device is prepared for each wavelength interval, and an appropriate connection destination is selected manually. In this case, however, a plurality of multiplexing/demultiplexing devices whose number correspond to the types of wavelength intervals need to be prepared, which raises the cost. In order to deal with this problem, in Patent Literature 1, the wavelength is selectively multiplexed/demultiplexed using the WSSs, and thus there is no need to prepare a multiplexing/demultiplexing device for each wavelength interval. However, in order to enable all the channels (all the wavelength bands) of the signals to be dropped in the dropping part of the optical branch insertion multiplexing device disclosed in Patent Literature 1, it is required to provide a wavelength selective switch including the WSSs 202 to 204 having 100 or more output ports, which cannot be implemented in reality.

The present disclosure has been made in view of the aforementioned circumstances and is intended to provide an optical demultiplexing device, an optical signal reception device, an optical signal transmission/reception device, and an optical demultiplexing method capable of demultiplexing optical signals whose wavelength intervals are different from one another while reducing the number of ports of the wavelength selective switch to be used.

Solution to Problem

In order to solve the aforementioned problems, the present disclosure provides, as a first aspect, an optical demultiplexing device including:

first branch means for branching an optical signal in which signals having a plurality of wavelength intervals different from one another are multiplexed by the number of wavelength intervals;

a plurality of band division means arranged so as to correspond to the plurality of respective wavelength intervals, the plurality of band division means generating, for each of the wavelength intervals, a band division signal in which a signal band of an optical signal branched by the first branch means is divided by a predetermined bandwidth and an odd channel and an even channel are separated from each other in each of the wavelength intervals;

a plurality of multiplexing means arranged, for each of the signal bands that have been divided, so as to correspond to the odd channel and the even channel, the plurality of multiplexing means multiplexing, for each of the signal bands that have been divided, the band division signals, output from the band division means, including odd channels of the respective wavelength intervals, and multiplexing, for each of the signal bands that have been divided, the band division signals including the even channels of the respective wavelength intervals;

a plurality of second branch means arranged, for each of the signal bands that have been divided, so as to correspond to the odd channel and the even channel, the plurality of second branch means branching each of a multiplexed signal including odd channels of the respective wavelength intervals multiplexed by using each of the multiplexing means and a multiplexed signal including even channels of the respective wavelength intervals into a plurality of communication devices; and control means for controlling the band division means, wherein each of the plurality of band division means includes a wavelength selective switch, and the control means controls the wavelength selective switch based on information indicating a signal arrangement of the signals in the respective wavelength intervals in the optical signal, causes the wavelength selective switch to output a signal of a wavelength band in which a signal of a corresponding wavelength interval is present to the multiplexing means, and causes the wavelength selective switch to cut off a signal of a wavelength band in which a signal of the corresponding wavelength interval is not present.

Further, the present disclosure provides, as a second aspect, an optical signal reception device including:

first branch means for branching an optical signal in which signals having a plurality of wavelength intervals different from one another are multiplexed by the number of wavelength intervals;

a plurality of band division means arranged so as to correspond to the plurality of respective wavelength intervals, the plurality of band division means generating, for each of the wavelength intervals, a band division signal in which a signal band of an optical signal branched by the first branch means is divided by a predetermined bandwidth and an odd channel and an even channel are separated from each other in each of the wavelength intervals;

a plurality of multiplexing means arranged, for each of the signal bands that have been divided, so as to correspond to the odd channel and the even channel, the plurality of multiplexing means multiplexing, for each of the signal bands that have been divided, the band division signals, output from the band division means, including odd channels of the respective wavelength intervals, and multiplexing, for each of the signal bands that have been divided, the band division signals including the even channels of the respective wavelength intervals;

a plurality of second branch means arranged, for each of the signal bands that have been divided, so as to correspond to the odd channel and the even channel, the plurality of second branch means branching each of a multiplexed signal including odd channels of the respective wavelength intervals multiplexed by using each of the multiplexing means and a multiplexed signal including even channels of the respective wavelength intervals into a plurality of communication devices;

control means for controlling the band division means; and an optical receiver for receiving the multiplexed signals branched by the second branch means, wherein each of the plurality of band division means includes a wavelength selective switch, and the control means controls the wavelength selective switch based on information indicating a signal arrangement of the signals in the respective wavelength intervals in the optical signal, causes the wavelength selective switch to output a signal of a wavelength band in which a signal of a corresponding wavelength interval is present to be output to the multiplexing means, and causes the wavelength selective switch to cut off a signal of a wavelength band in which a signal of the corresponding wavelength interval is not present.

The present disclosure further provides, as a third aspect, an optical signal transmission/reception device comprising:

an optical fiber;

optical multiplexing/demultiplexing devices arranged in the respective ends of the optical fiber; and an optical transceiver configured to transmit and/or receive an optical signal via the optical multiplexing/demultiplexing device, wherein the optical multiplexing/demultiplexing device comprises:

first branch means for branching an optical signal in which signals having a plurality of wavelength intervals different from one another are multiplexed by the number of wavelength intervals;

a plurality of band division means arranged so as to correspond to the plurality of respective wavelength intervals, the plurality of band division means generating, for each of the wavelength intervals, a band division signal in which a signal band of an optical signal branched by the first branch means is divided by a predetermined bandwidth and an odd channel and an even channel are separated from each other in each of the wavelength intervals;

a plurality of multiplexing means arranged, for each of the signal bands that have been divided, so as to correspond to the odd channel and the even channel, the plurality of multiplexing means multiplexing, for each of the signal bands that have been divided, the band division signal, output from the band division means, including odd channels of the respective wavelength intervals, and multiplexing, for each of the signal bands that have been divided, the band division signals including the even channels of the respective wavelength intervals;

a plurality of second branch means arranged, for each of the signal bands that have been divided, so as to correspond to the odd channel and the even channel, the plurality of second branch means branching each of a multiplexed signal including odd channels of the respective wavelength intervals multiplexed by using each of the multiplexing means and a multiplexed signal including even channels of the respective wavelength intervals into a plurality of communication devices; and control means for controlling the band division means, wherein each of the plurality of band division means includes a wavelength selective switch, and the control means controls the wavelength selective switch based on information indicating a signal arrangement of the signals in the respective wavelength intervals in the optical signal, causes the wavelength selective switch to output a signal of a wavelength band in which a signal of a corresponding wavelength interval is present to the multiplexing means, and causes the wavelength selective switch to cut off a signal of a wavelength band in which a signal of the corresponding wavelength interval is not present.

The present disclosure provides, as a fourth aspect, an optical demultiplexing method comprising:

branching an optical signal in which signals having a plurality of wavelength intervals different from one another are multiplexed by the number of wavelength intervals;

generating, for each of the optical signals that have been branched, a band division signal in which a signal band of an optical signal that has been branched is divided by a predetermined bandwidth and an odd channel and an even channel are separated from each other in each of the wavelength intervals;

multiplexing, for each of the signal bands that have been divided, a band division signals including odd channels of the respective wavelength intervals;

multiplexing, for each of the signal bands that have been divided, a band division signals including even channels of the respective wavelength intervals; and branching each of a multiplexed signal including odd channels of the respective wavelength intervals multiplexed and a multiplexed signal including even channels of the respective wavelength intervals into a plurality of communication devices, wherein when the band division signal is generated, a wavelength selective switch is controlled based on information indicating a signal arrangement of the signals in the respective wavelength intervals in the optical signal, thereby causing a signal of a wavelength band in which a signal of a corresponding wavelength interval is present to be included in the band division signal, and causing a signal of a wavelength band in which a signal of the corresponding wavelength interval is not present to be cut off by the wavelength selective switch.

Advantageous Effects of Invention

The optical demultiplexing device, the optical signal reception device, the optical signal transmission/reception device, and the optical demultiplexing method according to the present disclosure make it possible to demultiplex optical signals whose wavelength intervals are different from one another while reducing the number of ports of the wavelength selective switch to be used.

DESCRIPTION OF EMBODIMENTS

Figure 1:
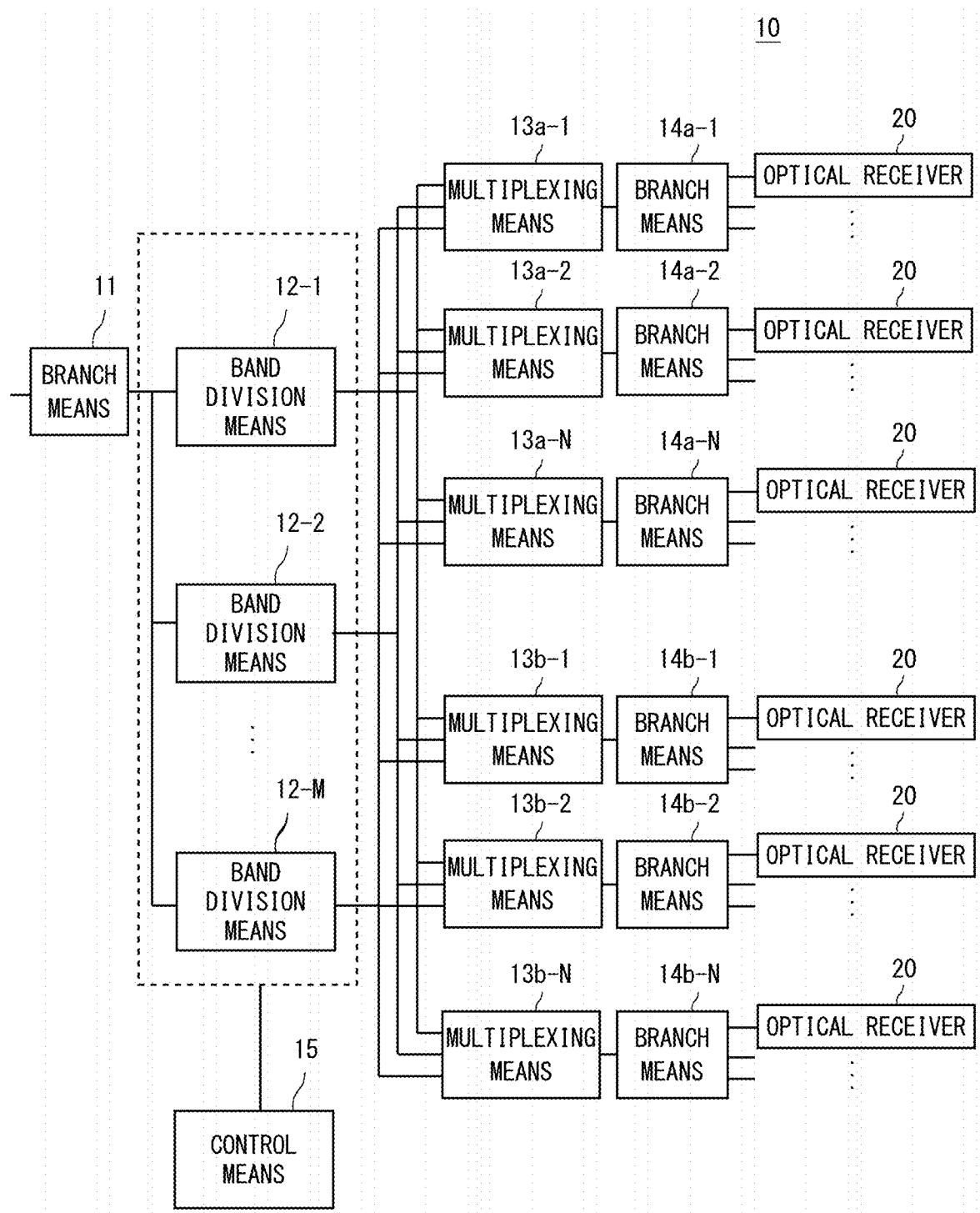
FIG. 1 is a block diagram showing a schematic optical demultiplexing device according to the present disclosure.

Prior to giving the description of example embodiments of the present disclosure, an outline of the present disclosure will be explained. FIG. 1 shows a schematic optical demultiplexing device according to the present disclosure. An optical demultiplexing device 10 includes branch means 11, band division means 12-1 to 12-M, multiplexing means 13a-1 to 13a-N and 13b-1 to 13b-N, branch means 14a-1 to 14a-N and 14b-1 to 14b-N, and control means 15, where each of N and M is an integer equal to or greater than two. In the following description, unless it is needed to specifically differentiate them, the band division means 12-1 to 12-M are also referred to as band division means 12. The same is applicable to the multiplexing means 13a-1 to 13a-N and 13b-1 to 13b-N, and the branch means 14a-1 to 14a-N and 14b-1 to 14b-N.

The branch means (first branch means) 11 branches an optical signal in which signals having a plurality of wavelength intervals different from one another are multiplexed by at least the number of wavelength intervals. The branch means 11 branches, for example, an optical signal into the band division means 12-1 to 12-M, where M denotes the number of wavelength intervals. The band division means 12 are arranged so as to correspond to the M respective wavelength intervals. Each of the band division means 12 divides, for each of the wavelength intervals, the signal band (wavelength band) of the optical signal branched by the branch means 11 by a predetermined bandwidth, and separates an odd channel and an even channel in each of the wavelength intervals. Each of the band division means 12 generates N band division signals including odd channels and N band division signals including even channels, where N denotes the divided number of the band. Each of the band division means 12 includes a wavelength selective switch.

The multiplexing means 13a and 13b are arranged so as to correspond to the odd channels and the even channels, respectively, for each of the signal bands divided by the band division means 12. It is assumed that the multiplexing means 13a is arranged so as to correspond to the odd channels and the multiplexing means 13b is arranged so as to correspond to the even channels. The multiplexing means 13a multiplexes the band division signals including the odd channels of the respective wavelength intervals for each of the divided bands. The multiplexing means 13b multiplexes the band division signals including the even channels of the respective wavelength intervals for each of the divided bands. More specifically, the multiplexing means 13a-1 to 13a-N multiplex M band division signals that have the same signal band and include the odd channels, the M band division signals being output from the respective band division means 12-1 to 12-M. In a similar way, the multiplexing means 13b-1 to 13b-N multiplex M band division signals that have the same signal band and include the even channels, the M band division signals being output from the respective band division means 12-1 to 12-M.

The branch means (second branch means) 14a and 14b are arranged so as to correspond to the odd channels and the even channels, respectively, for each of the signal bands that have been divided, similar to the multiplexing means 13a and 13b. The branch means 14a and 14b respectively branch the multiplexed signals multiplexed by the multiplexing means 13a and 13b into, for example, a plurality of optical receivers 20. More specifically, the branch means 14a-1 to 14a-N branch a multiplexed signal that has been multiplexed using the multiplexing means 13a-1 to 13a-N and includes the odd channels of the respective wavelength intervals into a plurality of optical receivers 20. The branch means 14b-1 to 14b-N branch a multiplexed signal that has been multiplexed using the multiplexing means 13b-1 to 13b-N and includes the even channels of the respective wavelength intervals into a plurality of optical receivers 20.

The control means 15 controls the band division means 12. In the present disclosure, the control means 15 controls, in particular, the wavelength selective switch included in the band division means 12 based on information indicating a signal arrangement of signals of the respective wavelength intervals in the optical signal. The control means 15 controls the wavelength selective switch, thereby causing the wavelength selective switch to output a signal of a signal band in which the signal of the corresponding wavelength interval is present to the multiplexing means 13a and 13b from the band division means 12 and causing the wavelength selective switch to cut off a signal of a signal band in which the signal of the corresponding wavelength interval is not present.

In the present disclosure, the optical signal is branched by the number of wavelength intervals using the branch means 11, and the signal band is divided into N division bands in each of the band division means 12. In this case, the band division means 12 separates the odd channels and the even channels, thereby generating band division signals that correspond to the respective channels. The control means 15 controls the wavelength selective switch included in the band division means 12 based on the information indicating the signal arrangement of the signals of the respective wavelength intervals, thereby causing a signal of a signal band in which a signal of the corresponding wavelength interval is present to be included in each band division signal. The multiplexing means 13a and 13b multiplex band division signals of the same signal band, and the branch means 14a and 14b output the multiplexed signal to the optical receiver 20. According to this procedure, the optical receiver 20 is able to receive an optical signal having a desired wavelength (channel) even when the optical signal includes signals having wavelength intervals different from one another.

In the present disclosure, the number of output ports of the wavelength selective switches included in the band division means 12 may be equal to the number of signal bands to be divided, and the wavelength selective switch need not have the same number of output ports as the number of optical receivers 20. Therefore, according to the present disclosure, it is possible to demultiplex the optical signals whose wavelength intervals are different from one another for a lower cost compared to Patent Literature 1.

Figure 2:
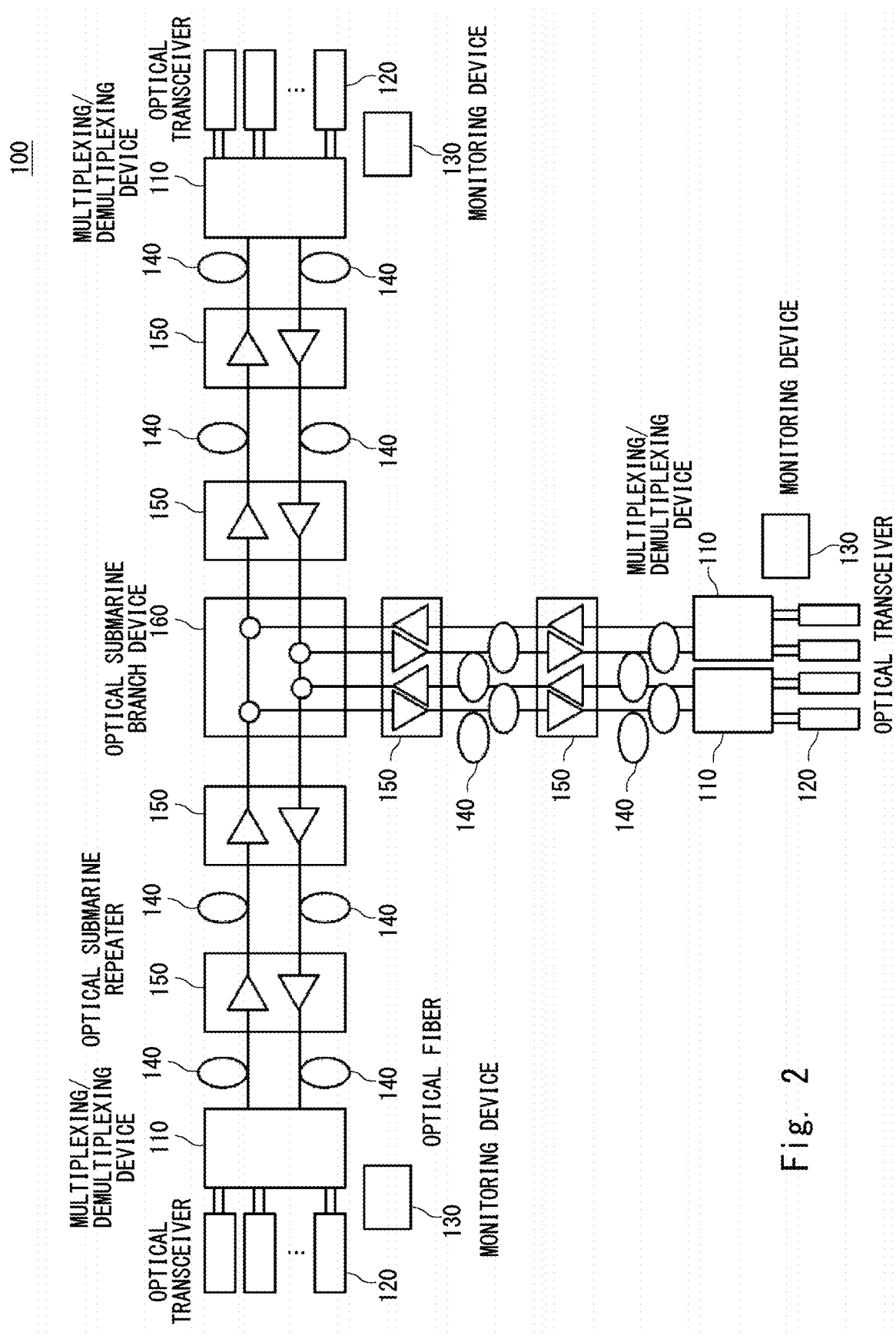
FIG. 2 is a block diagram showing an optical communication system (optical transmission system) to which the present disclosure may be applied.

Hereinafter, with reference to the drawings, example embodiments of the present disclosure will be explained in detail. FIG. 2 shows an optical communication system (an optical transmission system) to which the present disclosure may be applied. An optical communication system 100, which is, for example, a submarine cable system, includes a multiplexing/demultiplexing device 110, an optical transceiver 120, a monitoring device 130, an optical fiber 140, an optical submarine repeater 150, and an optical submarine branch device 160.

The multiplexing/demultiplexing device 110 includes a multiplexing block and a demultiplexing block. The multiplexing/demultiplexing device 110 multiplexes, in the multiplexing block, optical signals having a plurality of wavelengths input from the plurality of optical transceivers 120, and outputs the multiplexed signal to the optical fiber 140. Further, the multiplexing/demultiplexing device 110 demultiplexes, in the demultiplexing block, a WDM signal in which optical signals having a plurality of wavelengths are multiplexed, the WDM signal being input from the optical fiber 140, and outputs the demultiplexed signal to the optical transceiver 120.

The optical submarine repeater 150, which includes, for example, an optical amplifier or the like, amplifies the optical signal transmitted through the optical fiber 140. The optical submarine branch device 160 branches the path of the optical signal. The monitoring device 130 sets and monitors optical signals transmitted or received between the optical transceivers 120 at different points. The monitoring device 130 generates, for example, information indicating which optical signal of which wavelength interval is included in one signal band in the optical signals transmitted through the optical fiber 140.

Figure 3:
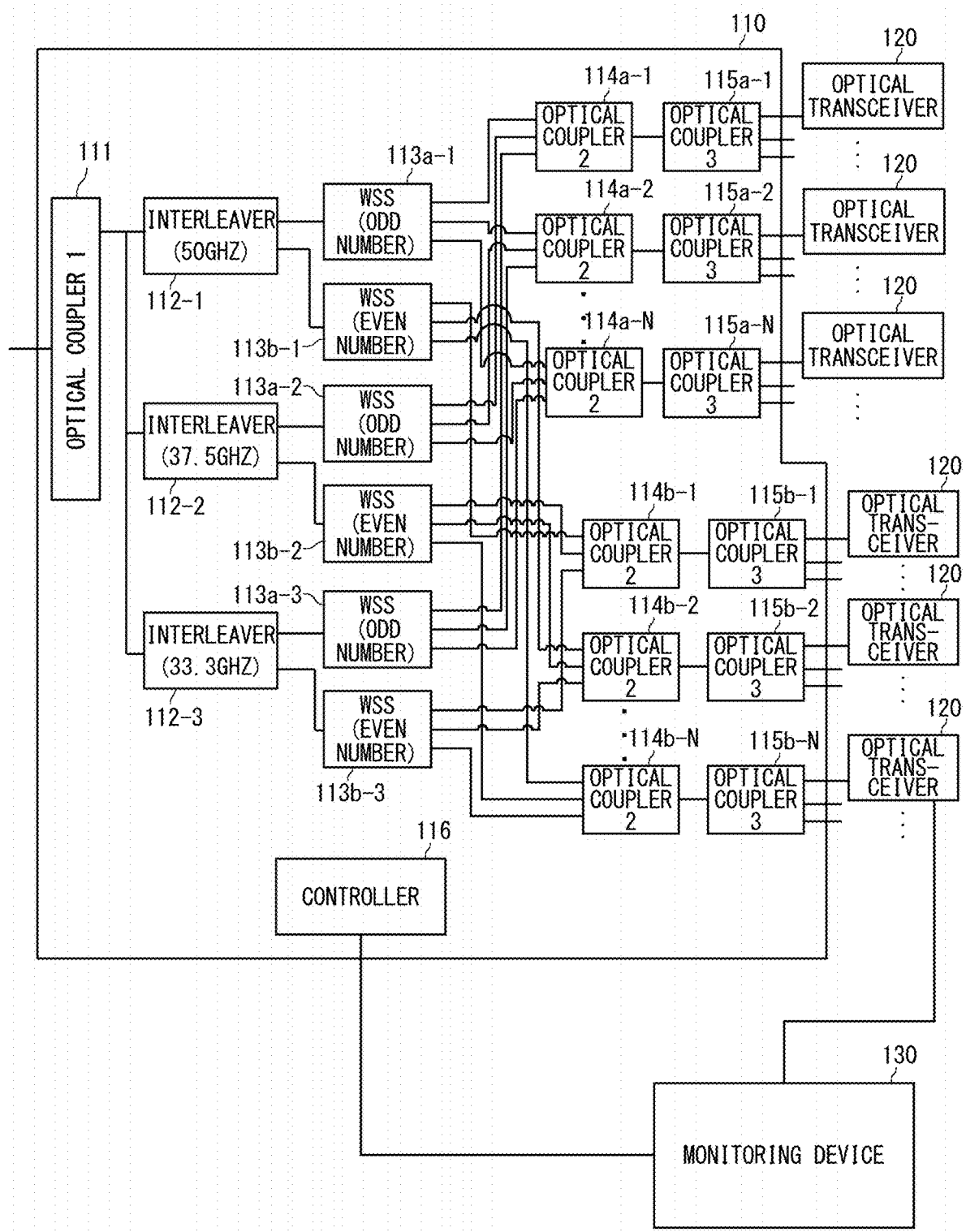
FIG. 3 is a block diagram showing a configuration of a demultiplexing block of a multiplexing/demultiplexing device according to a first example embodiment of the present disclosure.

FIG. 3 shows a configuration of the demultiplexing block (optical demultiplexing device) of the multiplexing/demultiplexing device 110 according to the first example embodiment of the present disclosure. The multiplexing/demultiplexing device 110 includes, as the demultiplexing block, an optical coupler (optical coupler 1) 111, interleavers 112-1 to 112-3, wavelength selective switches (WSSs) 113a-1 to 113a-3 and 113b-1 to 113b-3, optical couplers (optical coupler 2) 114a-1 to 114a-N and 114b-1 to 114b-N, optical couplers (optical coupler 3) 115a-1 to 115a-N and 115b-1 to 115b-N, and a controller 116.

In the following description, a demultiplexing block for demultiplexing the WDM signal on the receiver side of the optical signal will be mainly explained. The configuration of the multiplexing block (optical multiplexing device) on the transmission side in the multiplexing/demultiplexing device 110 may be similar to that of the optical demultiplexing device shown in FIG. 3 except that the signal flow is reversed. Further, in the following description, the interleavers 112-1 to 112-3 are also denoted by an interleaver 112 unless it is needed to specifically differentiate them. The same is applicable to the WSS 113a, the optical couplers 114a and 114b, and the optical couplers 115a and 115b.

Further, while the case in which the optical signal includes optical signals having wavelength intervals of 50 GHz, 37.5 GHz, and 33.3 GHz is assumed as an example in FIG. 3, other wavelength intervals may instead be applied. The number of wavelength intervals is not limited to three, and may be two, or four or more.

The optical coupler 111 branches an optical signal (WDM signal) input from the optical fiber 140 (see FIG. 1) by at least the number of wavelength intervals to be applied to the optical signal. The optical coupler 111 branches the optical signal by, for example, the number of wavelength intervals applied to the optical signal, or by a number more than the number of wavelengths intervals that are currently being applied in view of wavelength intervals to be applied in the future. In the example shown in FIG. 3, the optical coupler 111 branches the optical signal into the interleaver 112-1 that corresponds to the wavelength interval 50 GHz, the interleaver 112-2 that corresponds to the wavelength interval 37.5 GHz, and the interleaver 112-3 that corresponds to the wavelength interval 33.3 GHz. The optical coupler 111 corresponds to the branch means 11 shown in FIG. 1.

Each of the interleavers 112 separates the optical signal into an odd channel and an even channel that are adapted to each of the wavelength intervals. The interleaver is widely known in the field of optical communication system, and separates the input signal into an even channel and an odd channel having a wavelength interval twice as long as the channel interval. The interleaver 112-1 outputs the signal of the signal band that corresponds to the odd channel at the wavelength interval 50 GHz to the WSS 113a-1, and outputs the signal of the signal band that corresponds to the even channel to the WSS 113b-1. The interleaver 112-2 outputs the signal of the signal band that corresponds to the odd channel at the wavelength interval 37.5 GHz to the WSS 113a-2, and outputs the signal of the signal band that corresponds to the even channel to the WSS 113b-2. The interleaver 112-3 outputs the signal of the signal band that corresponds to the odd channel at the wavelength interval 33.3 GHz to the WSS 113a-3, and outputs the signal of the signal band that corresponds to the even channel to the WSS 113b-3.

The WSS 113a is a wavelength selective switch that corresponds to the odd channel, and the WSS 113b is a wavelength selective switch that corresponds to the even channel. The wavelength selective switch is widely known in the field of optical communication system, and is configured to be able to output a signal having an optional wavelength among the input signals to an optional port under certain wavelength resolution. The WSSs 113a and 113b divide the whole bands in which signals are arranged in a predetermined bandwidth. The WSSs 113a and 113b are configured as a wavelength selective switch having, for example, 1×N input/output ports, where N denotes the band divided number. The input ports of the WSSs 113a and 113b are optically coupled to the output of the interleaver 112, and the respective N output ports are optically coupled to the optical couplers 114a and 114b. The interleaver 112 and the WSSs 113a and 113b correspond to the band division means 12 shown in FIG. 1.

Figure 4:
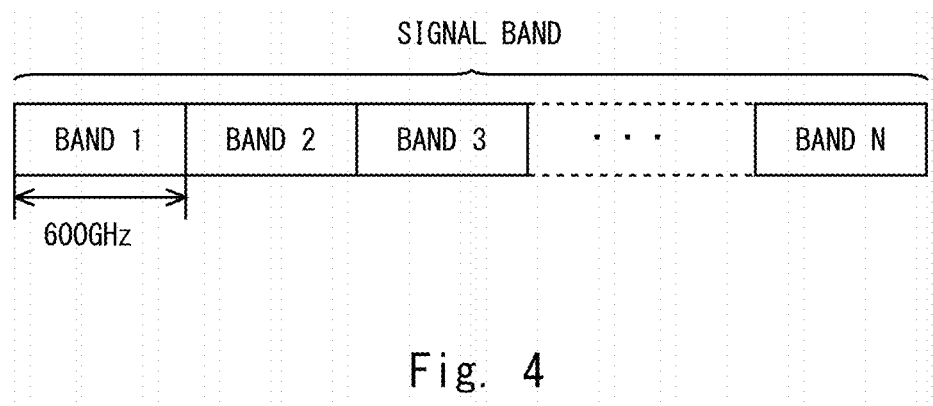
FIG. 4 is a block diagram showing signal band division.

FIG. 4 shows the signal band division. The WSSs 113a and 113b divide, for example, the whole bandwidth of the optical signal by N, and output the optical signals (band division signals) whose signal bands have been divided from the N output ports. The WSSs 113a and 113b divide, for example, the signal band by a unit of 600 GHz, and output the band division signals in the band 1 to band N having a bandwidth of 600 GHz from each output port. The band division signals output from the WSS 113a each include the signal of the signal band of the even channel in the corresponding wavelength interval, and the band division signals output from the WSS 113b each include the signal of the signal band of the even channel in the corresponding wavelength interval.

Referring once again to FIG. 3, the optical couplers 114a and 114b are arranged as many as the number of signal bands divided in the WSSs 113a and 113b, respectively. The optical couplers 114a and 114b multiplex band division signals output from the output ports that correspond to the same bandwidth among the output ports of the WSSs 113a and 113b. For example, the optical coupler 114a-1 multiplexes the optical signal of the signal band of the band 1 (see FIG. 4) output from the WSS 113a, the optical signal of the signal band of the band 1 output from the WSS 113a-2, and the optical signal of the band 1 output from the WSS 113a-3. The optical couplers 114a and 114b correspond to the multiplexing means 13a and 13b in FIG. 1.

The optical couplers 115a and 115b are respectively arranged so as to correspond to the optical couplers 114a and 114b. The optical couplers 115a and 115b branch the optical signal (band division signal) multiplexed by the optical couplers 114a and 114b by a predetermined number. The optical couplers 115a and 115b respectively branch, for example, the outputs of the optical couplers 114a and 114b by the number of signals (channels) included in the outputs. The optical transceiver 120 is connected to each of the output ports of the optical couplers 115a and 115b. The optical couplers 115a and 115b correspond to the branch means 14a and 14b in FIG. 1.

The optical transceiver 120 receives, via the optical coupler 115a or 115b, the optical signals included in the respective signal bands that have been divided. The optical transceiver 120 includes a receiver configured to receive an optical signal by, for example, a digital coherent reception method. The optical transceiver 120 controls the wavelength of a local light and selects the wavelength (channel) that is received by causing the local light to interfere with the optical signal. The monitoring device 130 sets a reception wavelength, a transmission wavelength, and wavelength intervals in each of the optical transceivers 120.

The controller 116 controls the WSSs 113a and 113b. The controller 116 acquires configuration information regarding the reception wavelength and the wavelength intervals set in each of the optical transceivers 120 from the monitoring device 130. This configuration information corresponds to information indicating a signal arrangement of signals of the respective wavelength intervals in the optical signal transmitted through the transmission path. In other words, the configuration information indicates information indicating which wavelength interval each of the channels correspond to. The controller 116 controls the WSSs 113a and 113b in such a way that the WSSs 113a and 113b output a signal of a signal band in which a signal of a corresponding wavelength interval is present to the optical couplers 114a and 114b and cut off signals of signal bands in which the signal of the corresponding wavelength interval is not present. The controller 116 corresponds to the control means 15 shown in FIG. 1.

Figure 5:
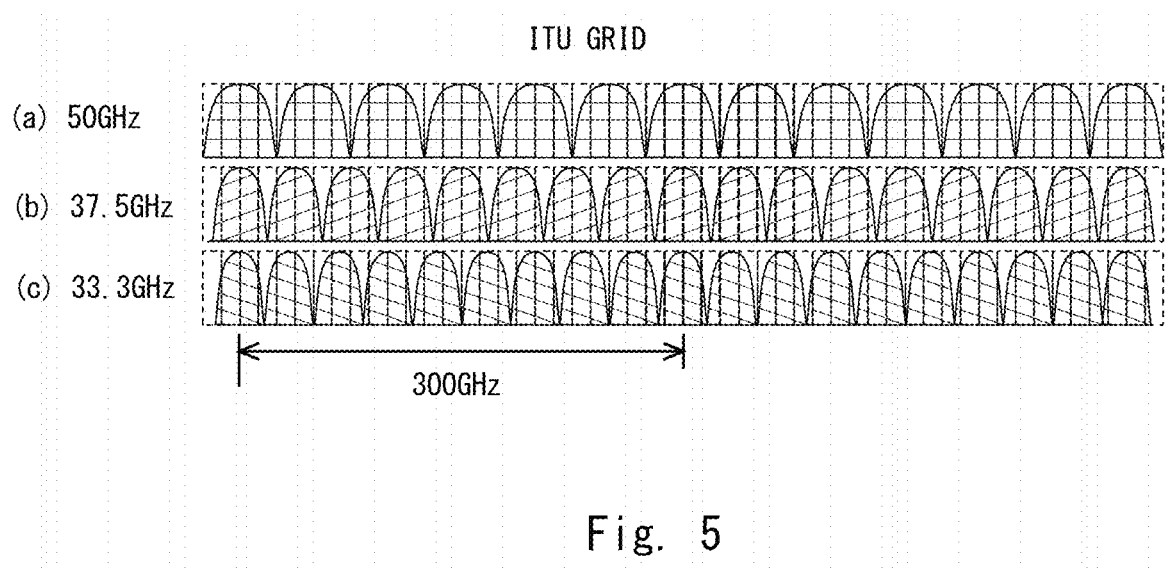
FIG. 5 is a diagram showing a wavelength grid for each wavelength interval defined by ITU-T.

Hereinafter, descriptions will be given using specific examples. FIG. 5 shows a wavelength grid for each wavelength interval defined in International Telecommunication Union Telecommunication Standardization Sector (ITU-T). In FIG. 5, (a) shows a wavelength grid when the wavelength interval is 50 GHz, in FIG. 5, (b) shows a wavelength grid when the wavelength interval is 37.5 GHz, and in FIG. 5, (c) shows a wavelength grid when the wavelength interval is 33.3 GHz.

In the ITU-T, the wavelength grids do not depend on the wavelength intervals and are defined on the basis of 193.1 THz. For example, when the wavelength interval is 50 GHz, the wavelength grid is 193.1±0.050×n (THz), where n denotes a positive integer. When the wavelength interval is 37.5 GHz, the wavelength grid is 193.1±0.0375×n (THz). When the wavelength interval is 33.3 GHz, the wavelength grid is 193.1±(0.1/3)×n (THz). When the wavelength intervals are 50 GHz, 37.5 GHz, and 33.3 GHz, as shown in FIG. 5, the center frequencies of the wavelength grids match each other for each 300 GHz, which is the least common multiple of the wavelength intervals.

Figure 6:
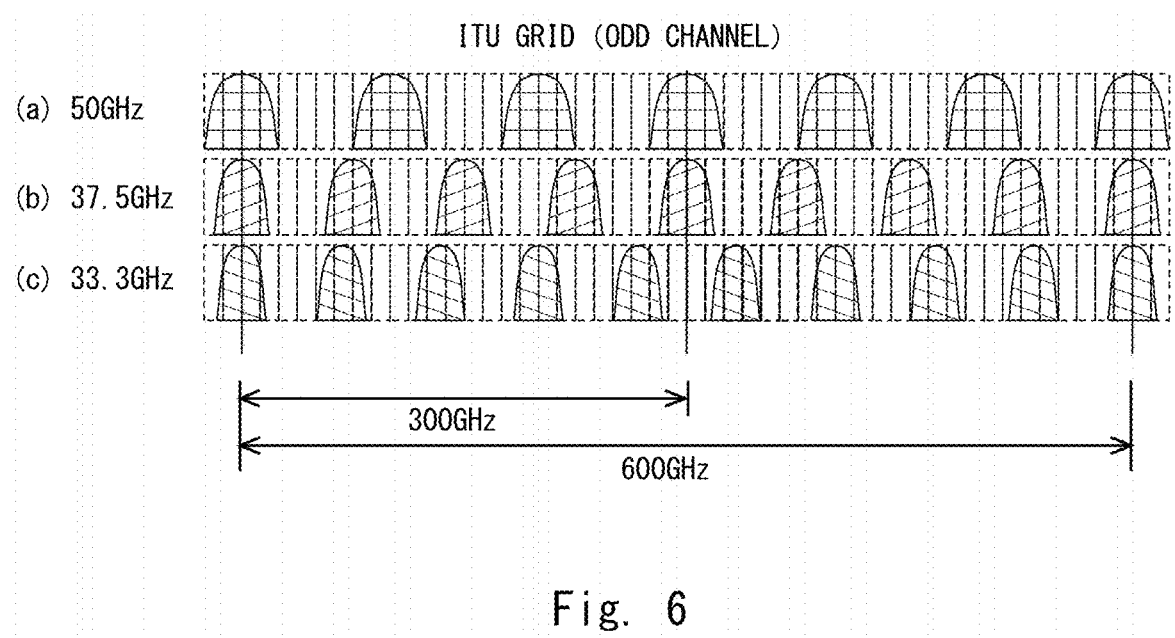
FIG. 6 is a diagram showing wavelength grids of odd channels of the respective wavelength intervals.
Figure 7:
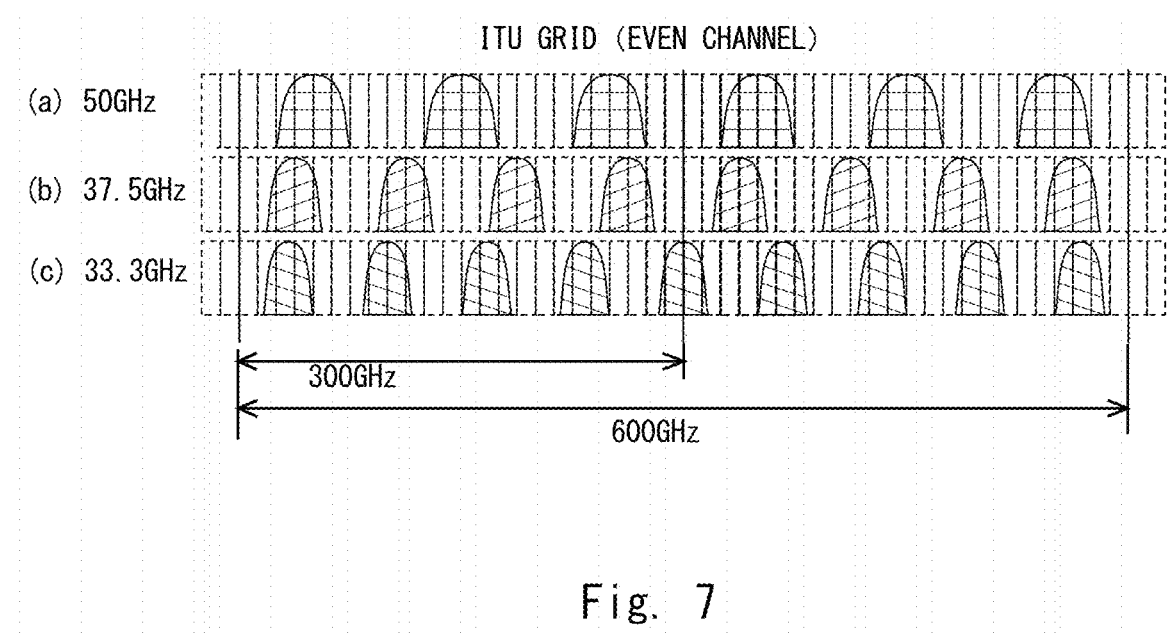
FIG. 7 is a diagram showing wavelength grids of even channels of the respective wavelength intervals.

FIG. 6 shows wavelength grids of the odd channels of the respective wavelength intervals. Further, FIG. 7 shows wavelength grids of the even channels of the respective wavelength intervals. In FIGS. 6 and 7, (a) shows the wavelength grid of the odd channel and the wavelength grid of the even channel when the wavelength interval is 50 GHz. In FIGS. 6 and 7, (b) shows the wavelength grid of the odd channel and the wavelength grid of the even channel when the wavelength interval is 37.5 GHz. In FIGS. 6 and 7, (c) shows the wavelength grid of the odd channel and the wavelength grid of the even channel when the wavelength interval is 33.3 GHz.

The respective interleavers 112 (see FIG. 3) output the signals of the signal bands that correspond to the wavelength grids of the odd channels shown in (a) to (c) in FIG. 6 among the optical signals input from the optical coupler 111 to the respective WSSs 113a. Further, the respective interleavers 112 output the signals of the signal bands that correspond to the wavelength grids of the odd channels shown in (a) to (c) in FIG. 7 among the optical signals input from the optical coupler 111 to the respective WSSs 113b.

More specifically, the interleaver 112-1 separates the signal at intervals of 50 GHz shown in (a) in FIG. 4 into an even channel and an odd channel at intervals of 100 GHz, and outputs the separated signals to the WSSs 113a-1 and 113b-1, respectively. Further, the interleaver 112-2 separates the signal at intervals of 37.5 GHz shown in (b) in FIG. 4 into an even channel and an odd channel at intervals of 70 GHz, and outputs the separated signals to the WSSs 113a-2 and 113b-2, respectively. The interleaver 112-3 separates the signal at intervals of 33.3 GHz shown in (c) in FIG. 4 into an even channel and an odd channel at intervals of 66.7 (200/3) GHz, and outputs the separated signals to the WSSs 113a-3 and 113b-3, respectively.

Now, division of the signal bands in the WSSs 113a and 113b will be explained. It is assumed that the WSSs 113a and 113b are each able to output a signal having an optional wavelength to an optional port under the wavelength resolution of, for example, 12.5 GHz. The wavelength resolution of the WSSs 113a and 113b may be smaller than 12.5 GHz.

Referring to (a) to (c) in FIGS. 6 and 7, it will be understood that the signals that have been divided into the odd channels and the even channels each have periodicity at intervals of 600 GHz, which is twice as large as the least common multiple of the wavelength interval to be applied to the WDM signal. In this example embodiment, the WSSs 113a and 113b divide the whole signal band into a plurality of bandwidths at a bandwidth twice as large as the least common multiple of the wavelength interval to be applied, and output the band division signals to the respective ports.

When the above signal bands are divided, a wavelength in which no signal is arranged is selected as the boundary of each division band. This boundary wavelength can be obtained by calculation. Specifically, regarding the odd channel, the boundary frequency is calculated by (193.1+0.6×i+0.0375) THz, where i may be any one of positive and negative integers that are necessary to cover the whole signal band. The boundary frequency calculated by this expression is applied to each of the WSSs 113a that correspond to the odd channels. On the other hand, regarding the even channels, the boundary frequency is calculated by (193.1+0.6×i) THz. The boundary frequency calculated by this expression is applied to each of the WSSs 113b that correspond to the even channels.

The above calculations of the boundary frequencies are performed by, for example, the controller 116 in accordance with the wavelength interval to be applied to the WDM signal. The controller 116 controls the WSSs 113a and 113b in such a way that the signal band is divided into a plurality of bands with the calculated boundary frequency as a boundary. The controller 116 may calculate, when, for example, the wavelength interval to be applied has been changed, the boundary frequency again in accordance with this change. The controller 116 controls the WSSs 113a and 113b in such a way that band division is performed at intervals of 300 GHz in the WSSs 113a and 113b when, for example, the wavelength intervals to be applied to the WDM signal are 50 GHz and 37.5 GHz only. The controller 116 controls the WSSs 113a and 113b in such a way that band division is performed at intervals of 600 GHz in the WSSs 113a and 113b when 33.3 GHz is added to the wavelength interval to be applied to the WDM signal.

Figure 8:
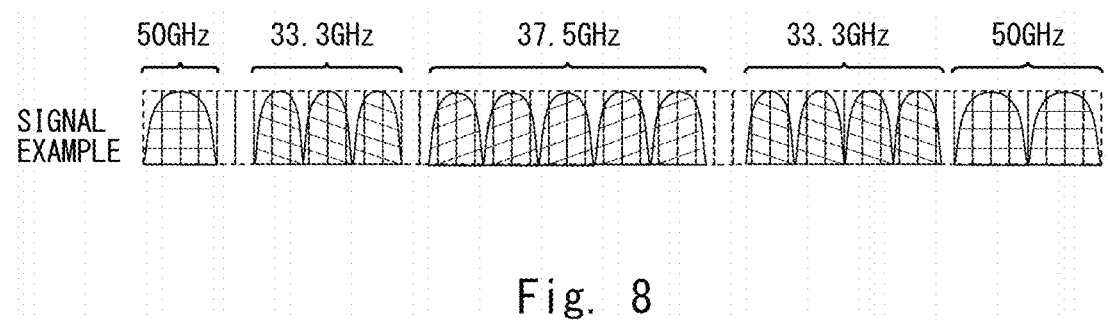
FIG. 8 is a diagram showing a signal example of a WDM signal in which a plurality of wavelength intervals are mixed therein.

FIG. 8 shows a signal example of the WDM signal in which a plurality of wavelength intervals are mixed. In this example, optical signals of a plurality of channels are multiplexed in the wavelength grids at the wavelength interval of 50 GHz, the wavelength interval of 33.3 GHz, the wavelength interval of 37.5 GHz, the wavelength interval of 33.3 GHz, and the wavelength interval of 50 GHz from the left to the right on the paper. The WDM signal in which the optical signals of a plurality of wavelength intervals are multiplexed, for example as shown in FIG. 8, is input to the optical coupler 111 (see FIG. 3).

Figure 9:
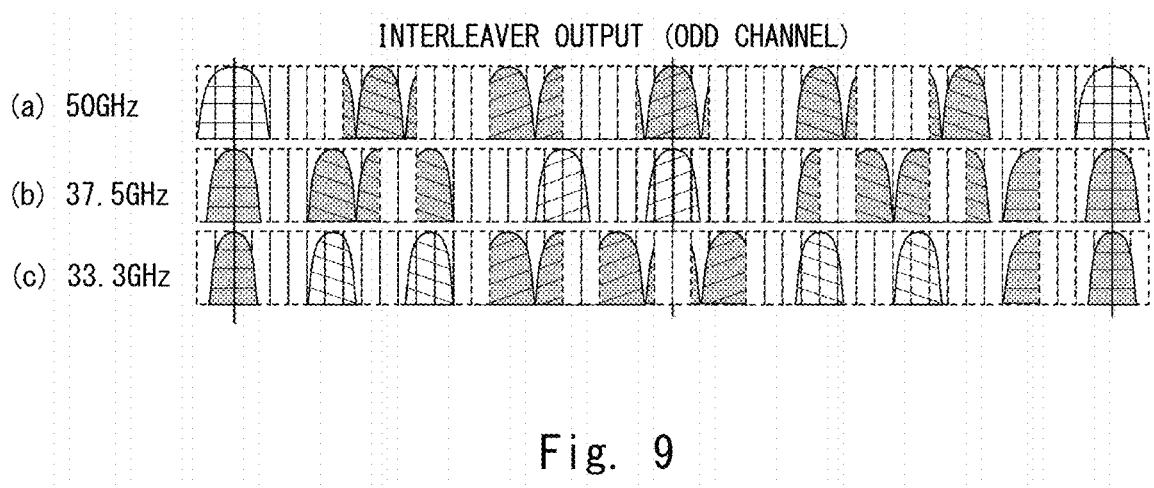
FIG. 9 is a diagram showing an output signal example of an odd channel separated by an interleaver.
Figure 10:
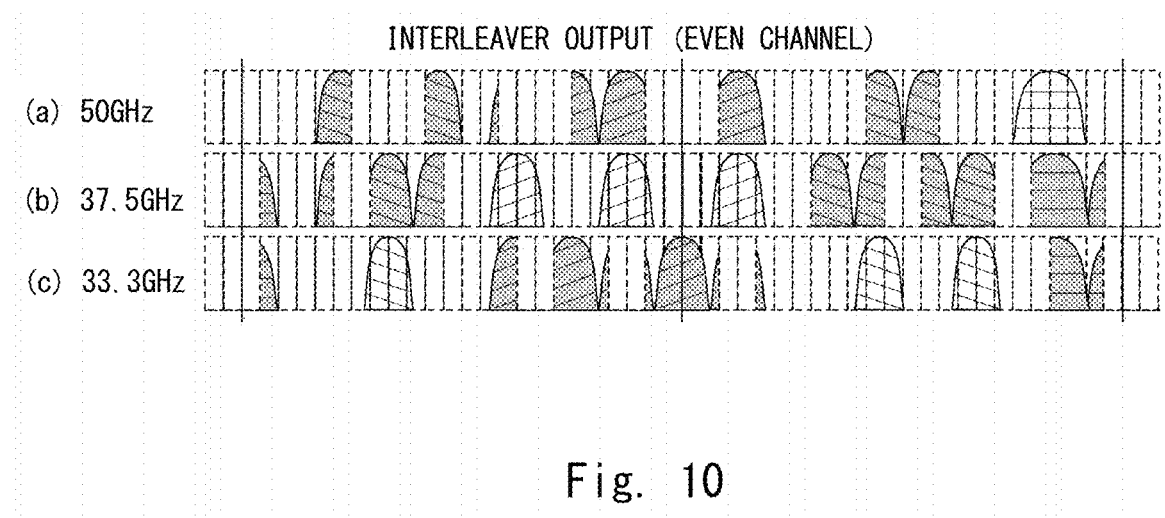
FIG. 10 is a diagram showing an output signal example of an even channel separated by the interleaver.

FIG. 9 shows an output signal example of the odd channel separated in each of the interleavers 112. Further, FIG. 10 shows an output signal example of the even channel separated in each of the interleavers 112. In FIGS. 9 and 10, (a) shows an output signal example of the interleaver 112-1 that corresponds to the wavelength interval 50 GHz. In FIGS. 9 and 10, (b) shows an output signal example of the interleaver 112-2 that corresponds to the wavelength interval 37.5 GHz. In FIGS. 9 and 10, (c) shows an output signal example of the interleaver 112-3 that corresponds to the wavelength interval 33.3 GHz.

Consider, for example, the WDM signal shown in FIG. 8 as an input signal to each of the interleavers 112. In this case, the interleaver 112-1 separates the input signal into the odd channel and the even channel, as shown in (a) in FIGS. 9 and 10. Further, the interleaver 112-2 separates the input signal into the odd channel and the even channel, as shown in (b) in FIGS. 9 and 10. The interleaver 112-3 separates the input signal into the odd channel and the even channel, as shown in (c) in FIGS. 9 and 10.

The interleaver 112-1 is an interleaver that corresponds to the wavelength interval 50 GHz, and separates the signal for each of the signal band of the odd channel and the signal band of the even channel shown in (a) FIGS. 6 and 7, respectively. When the signal to be input to the interleaver 112-1 includes wavelength intervals 37.5 GHz and 33.3 GHz, which are different from the corresponding wavelength interval 50 GHz, as shown in (a) in FIGS. 9 and 10, the output signal of the interleaver 112-1 also includes unwanted signals of wavelength intervals 37.5 GHz and 33.3 GHz that do not correspond. In a similar way, the output signal of the interleaver 112-2 also includes, as shown in (b) in FIGS. 9 and 10, signals at the unwanted wavelength intervals 50 GHz and 33.3 GHz, and the output signal of the interleaver 112-3 also includes, as shown in (c) in FIGS. 9 and 10, signals at the unwanted wavelength intervals 50 GHz and 37.5 GHz.

The above unwanted signals output from the respective interleavers 112 interfere normal reception in the optical transceiver 120. In order to solve this problem, in this example embodiment, the WSS 113 performs, besides division of the signal band, cutoff of the unwanted signals using wavelength selection characteristics of wavelength selective switches. It is assumed that, when the optical transceiver 120 is installed and operated, the wavelength and the wavelength interval are set in advance in each of the optical transceivers 120 using the monitoring device 130. The monitoring device 130 controls the WSSs 113a and 113b based on information on the wavelength and the wavelength interval of each of the optical transceivers 120 through the controller 116, and sets the WSSs to block the unwanted signals.

The controller 116 causes, for example, the signal band in which the signal of the corresponding wavelength interval is present and the signal band in which no signal of any wavelength interval is present, to be output from the output ports of the WSSs 113a and 113b. The controller 116 causes, for example, the signal bands in which signals in wavelength intervals different from the corresponding wavelength interval is present to be cut off without causing them to be output from the output ports of the WSSs 113a and 113b. For example, When the signal at the wavelength interval of 50 GHz is arranged in the wavelength grid with 193.1 THz as a center wavelength, the controller 116 causes the signal of the signal band of ±25 GHz with 193.1 THz at the center to be output from the predetermined output port of the WSS 113a-1 that corresponds to the wavelength interval of 50 GHz. In this case, the controller 116 causes the WSSs 113a-2 and 113b-3 that correspond to the other wavelength intervals to block the signal of the signal band of ±25 GHz with 193.1 THz at the center.

Figure 11:
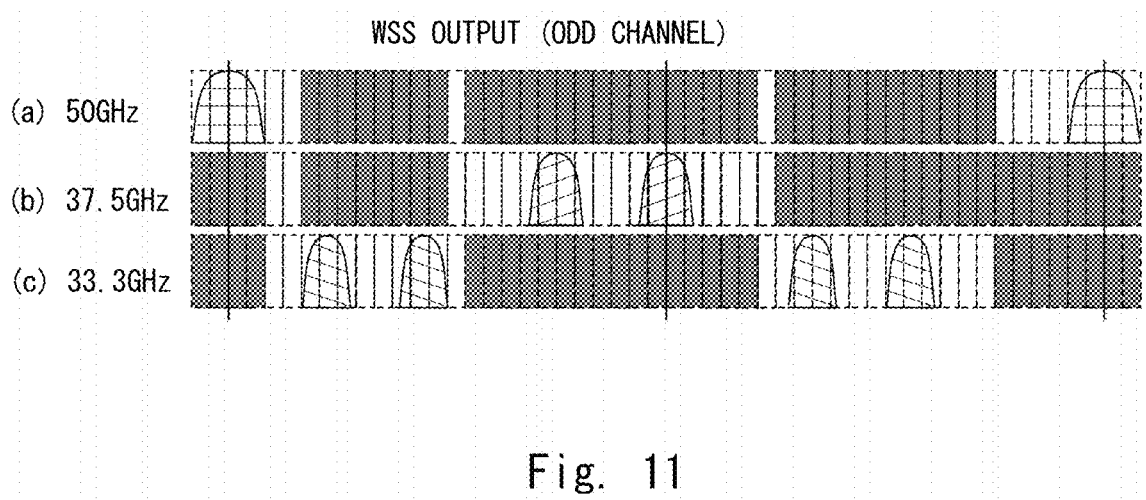
FIG. 11 is a diagram showing an output signal example of a WSS that corresponds to the odd channel.
Figure 12:
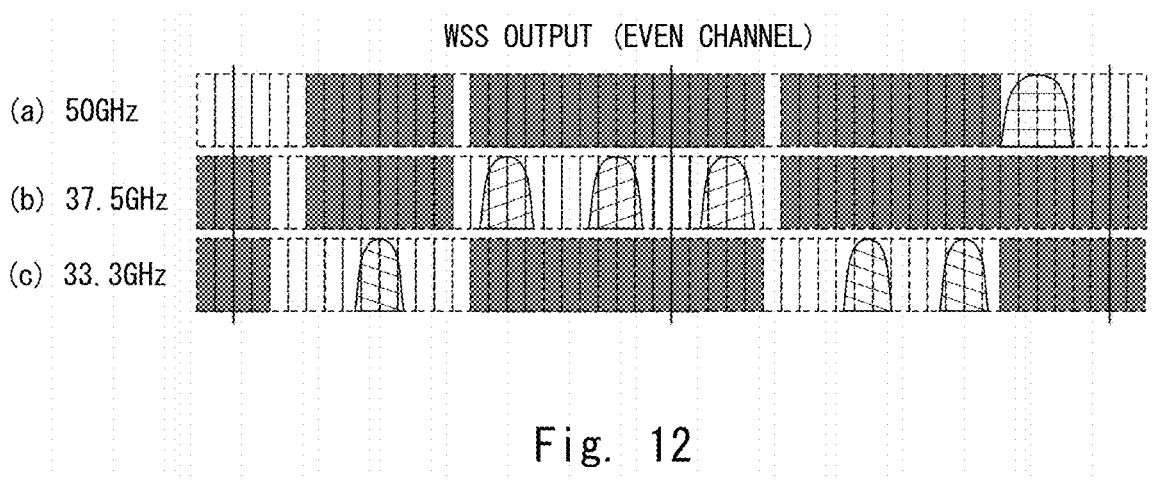
FIG. 12 is a diagram showing an output signal example of a WSS that corresponds to the even channel.

FIG. 11 shows an output signal example of the WSS 113a that corresponds to the odd channel. Further, FIG. 12 shows an output signal example of the WSS 113b that corresponds to the even channel. In FIGS. 11 and 12, (a) shows output signal examples of the WSSs 113a-1 and 113b-1 that correspond to the wavelength interval 50 GHz. In FIGS. 11 and 12, (b) shows output signal examples of the WSSs 113a-2 and 113b-2 that correspond to the wavelength interval 37.5 GHz. In FIGS. 11 and 12, (c) shows output signal examples of the WSSs 113a-3 and 113b-3 that correspond to the wavelength interval 33.3 GHz.

In (a) to (c) in FIGS. 11 and 12, the area shown in white indicates the signal band in which the signal is output from the output ports of the WSSs 113a and 113b and the area shown in gray indicates the signal band in which the signal is cut off in the WSSs 113a and 113b. The controller 116 controls the WSSs 113a and 113b in such a way as to output, for example, the wavelength included between one boundary wavelength and the next boundary wavelength from one output port of each of the WSSs 113a and 113b. However, the controller 116 prevents the wavelengths in which signals in wavelength intervals different from the corresponding wavelength interval are present in each of the WSSs 113a and 113b from being output from these output ports.

For example, as shown in (a) FIGS. 11 and 12, in the WSSs 113a-1 and 113b-1 that correspond to the wavelength interval of 50 GHz, the controller 116 causes the signal band in which a signal having a wavelength interval of 50 GHz is present in the WDM signal shown in FIG. 8 to be output from the output ports of the respective WSSs. In this case, the controller 116 controls the WSSs 113a-1 and 113b-1 in such a way that the signal bands in which signals having other wavelength intervals are present in the WDM signal are blocked in the WSSs 113a-1 and 113b-1.

Further, as shown in (b) FIGS. 11 and 12, in the WSSs 113a-2 and 113b-2 that correspond to the wavelength interval of 37.5 GHz, the controller 116 causes the signal band in which a signal having a wavelength interval of 37.5 GHz is present in the WDM signal to be output from the output ports of the respective WSSs. In this case, the controller 116 controls the WSSs 113a-2 and 113b-2 in such a way that signal bands in which signals having other wavelength intervals are present in the WDM signal are blocked in the WSSs 113a-2 and 113b-2.

As shown in (c) in FIGS. 11 and 12, in the WSSs 113a-3 and 113b-3 that correspond to the wavelength interval of 33.3 GHz, the controller 116 causes the signal band in which signal having a wavelength interval of 33.3 GHz is present in the WDM signal to be output from the output ports of the respective WSSs. In this case, the controller 116 controls the WSSs 113a-1 and 113b-1 in such a way that the signal bands in which signals having other wavelength intervals are present in the WDM signal are blocked in the WSSs 113a-3 and 113b-3. Each of the WSSs 113a and 113b allocates, for example, the output port to be output at intervals of 600 GHz while cutting off unnecessary bands, whereby it is possible to concurrently perform cutoff of unnecessary bands and division of the signal band.

Figure 13:
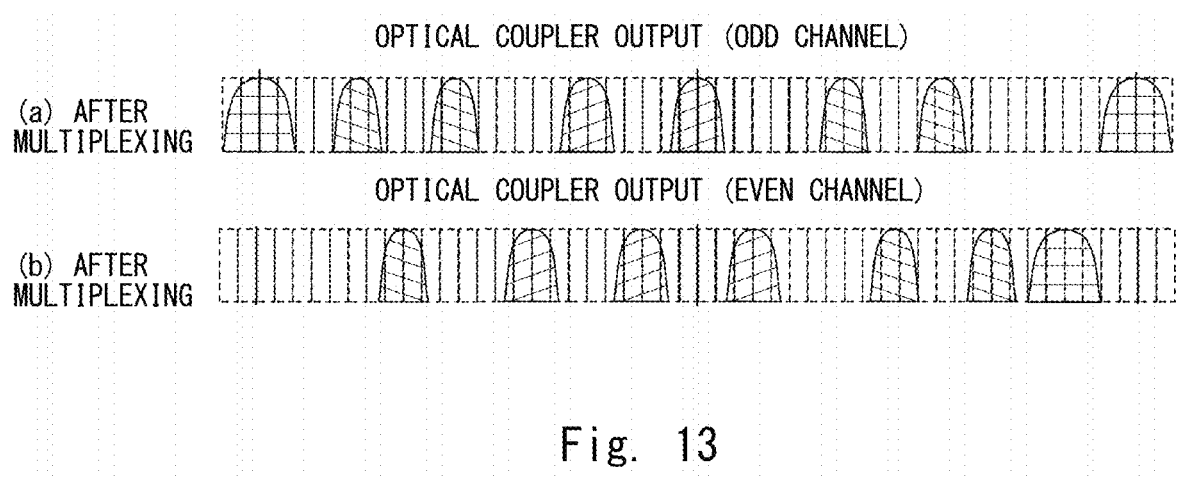
FIG. 13 is a diagram showing a signal example of signals multiplexed by an optical coupler.

In FIG. 13, (a) and (b) respectively show signal examples of the signals multiplexed by the optical couplers 114a and 114b. The optical coupler 114a multiplexes the output signals of the WSS 113a that correspond to the respective wavelength intervals shown in (a) to (c) in FIG. 11, thereby generating a multiplexed signal of an odd channel shown in (a) in FIG. 13. Further, the optical coupler 114b multiplexes the output signals (even channels) of the WSS 113b that correspond to the respective wavelength intervals shown in (a) to (c) in FIG. 12, thereby generating a multiplexed signal of an even channel shown in (a) in FIG. 13. The WSSs 113a and 113b cut off signals of the bands including signals having wavelength intervals different from the corresponding wavelength interval. Therefore, the optical couplers 114a and 114b are able to multiplex the signals of the respective wavelength intervals included in the WDM signal in a state in which unwanted signals are not included.

The multiplexed signal shown in (a) or (b) in FIG. 13 is input to the optical transceiver 120 via the optical coupler 115a or 115b. The multiplexed signal includes a plurality of signals having wavelengths and wavelength intervals different from one another. In a coherent receiver widely applied to the current optical communication system, a wavelength of a local light that the receiver has is made coincide with the signal wavelength that is desired to be received, whereby it is possible to select a specific wavelength signal from among a plurality of input signals and receive the selected signal. The optical couplers 115a and 115b include, for example, output ports whose number is equal to or greater than the maximum number of the signals that may be included in the signal multiplexed by the optical couplers 114a and 114b, and the optical transceiver 120 is connected to an optional output port of the optical couplers 115a and 115b. The optical transceiver 120 is able to receive an optical signal having an optional wavelength in a signal band that has been divided.

In this example embodiment, the multiplexing/demultiplexing device 110 branches an optical signal in which signals having a plurality of wavelength intervals different from one another are multiplexed by at least the number of wavelength intervals in the optical coupler 111. The interleaver 112 separates the odd channel and the even channel for each of the optical signals that have been divided, and the WSSs 113a and 113b each generate a band division signal in which a signal band of the optical signal of the odd channel and the even channel that have been separated is divided by a predetermined bandwidth. The optical couplers 114a and 114b multiplex the band division signals including the odd channels and the even channels of the respective wavelength intervals for each of the signal bands that have been divided. The optical couplers 115a and 115b each branch the multiplexed signal including the odd channels and the even channels of the wavelength intervals that have been multiplexed into the optical transceiver 120.

In this example embodiment, the controller 116 controls each of the WSSs 113a and 113b based on the information indicating the signal arrangement of the signal of each wavelength interval in the optical signal, thereby causing a signal of the signal band in which a signal of the corresponding wavelength interval is present to be included in the band division signal and causing signals of signal bands in which a signal of the corresponding wavelength interval is not present to be cut off by the WSSs 113a and 113b. According to this procedure, it is possible to demultiplex a WDM signal in which optical signals whose wavelength intervals are different from one another are multiplexed in accordance with the wavelength interval. Even when a wavelength interval of a part of the wavelengths or a part of the wavelength bands has been changed, the multiplexing/demultiplexing device 110 is able to demultiplex the optical signals in accordance with the wavelength interval by appropriately controlling the signal band cut off by the WSSs 113a and 113b.

In this example embodiment, the WSSs 113a and 113b each include output ports whose number correspond to the number of signal bands that have been divided. In general, as the number of ports included in a wavelength selective switch becomes larger, it becomes difficult to implement this wavelength selective switch and its cost increases. As a comparison, in Patent Literature 1, in order to receive, for example, a signal of 100 waves, the wavelength selective switch having 100 output ports 100 is needed. However, it is not realistic to provide the wavelength selective switch having a large number of output ports. In this example embodiment, the number of output ports required for each of the WSSs 113a and 113b may be smaller than the number of signals to be received, whereby it is possible to perform demultiplexing in accordance with the wavelength interval while suppressing the cost.

Figure 14:
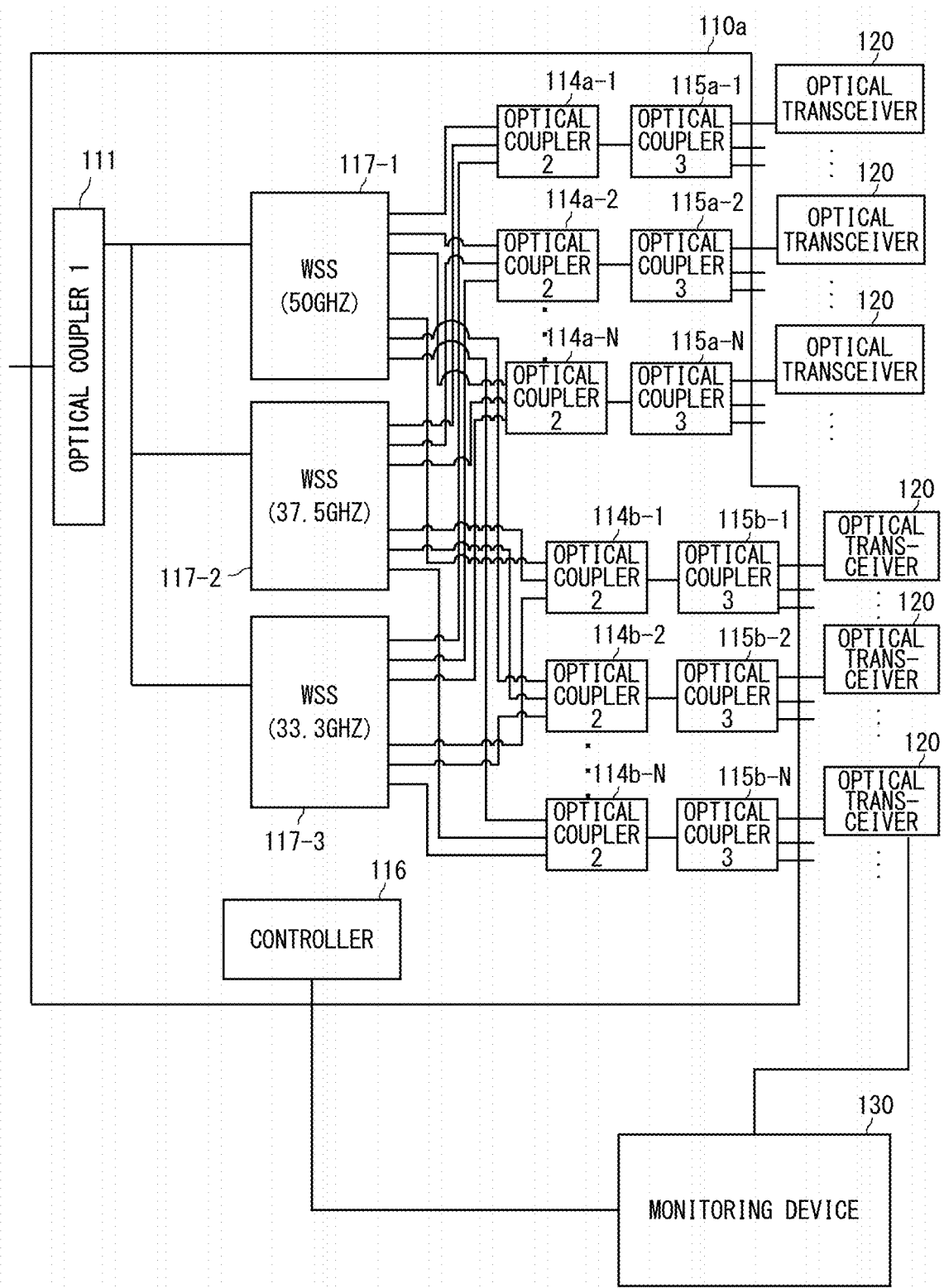
FIG. 14 is a block diagram showing a demultiplexing block in the multiplexing/demultiplexing device according to a second example embodiment of the present disclosure.
Figure 15:
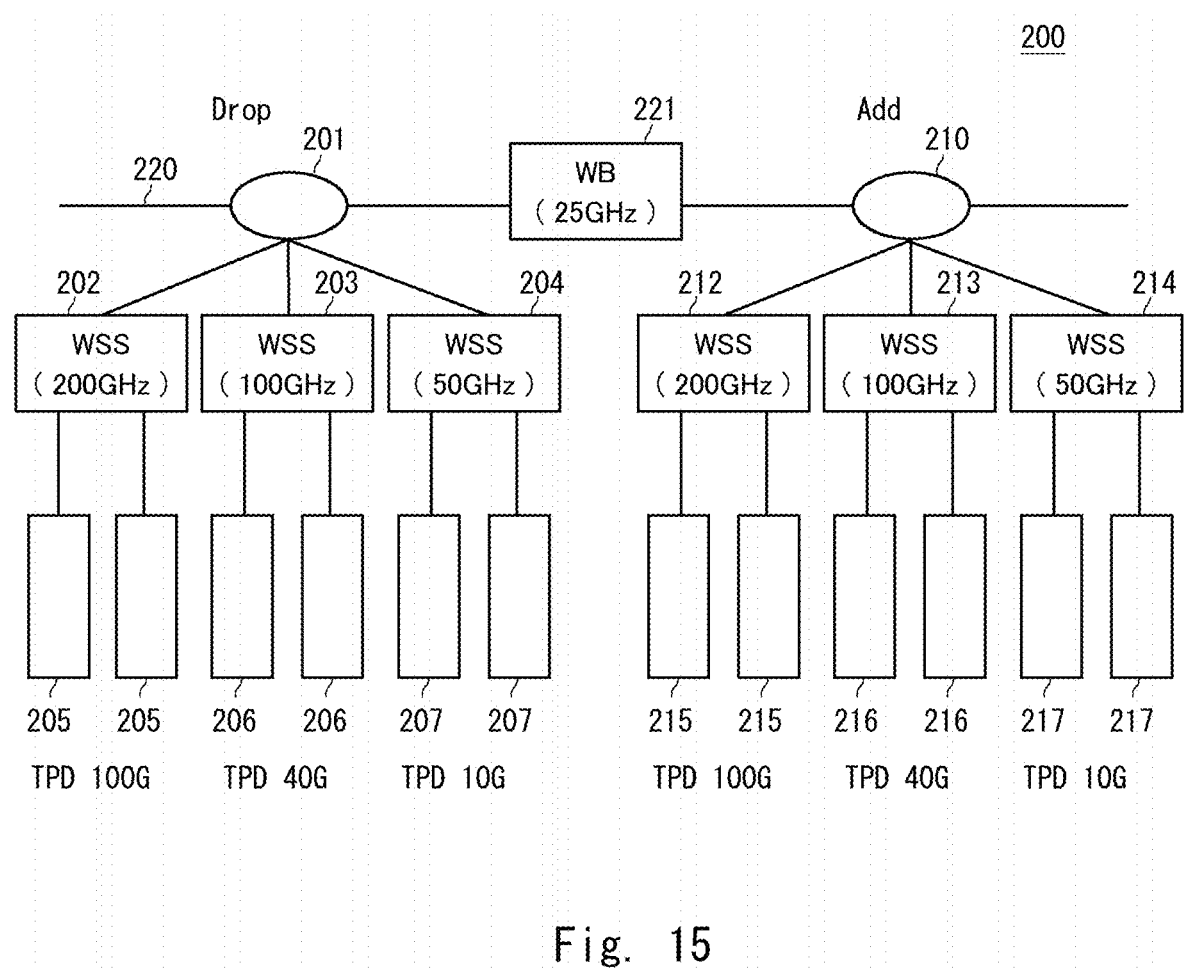
FIG. 15 is a block diagram showing an optical branch insertion multiplexing device disclosed in Patent Literature 1.

Next, a second example embodiment of the present disclosure will be explained. FIG. 14 shows a demultiplexing block in a multiplexing/demultiplexing device according to the second example embodiment. A multiplexing/demultiplexing device 100a according to this example embodiment is different from the multiplexing/demultiplexing device 110 according to the first example embodiment in that the multiplexing/demultiplexing device 110b according to this example embodiment includes a WSS 117 in place of the interleaver 112 and the WSSs 113a and 113b (see FIG. 3). The other points may be similar to those described in the first example embodiment. The WSS 117 is arranged so as to correspond to each of the wavelength intervals to be applied to the WDM signal.

In this example embodiment, the WSS 117 divides the signal band into a plurality of division bands, similar to the WSSs 113a and 113b. Further, the WSS 117 also functions as an interleaver separating the optical signal branched by the optical coupler 111 into an odd channel and an even channel. The WSS 117 is configured as a wavelength selective switch including, for example, 1×2N input/output ports.

The input port of the WSS 117 is optically coupled to the output of the interleaver 112. Of the 2N output ports of the WSS 117, N output ports are optically coupled to the optical coupler 114a and the other N output ports are optically coupled to the optical coupler 114b. The WSS 117 outputs, for example, the band division signal including the signal of the odd channel to the optical coupler 114a from the output ports whose port numbers are from 1 to N. Further, the WSS 117 outputs the band division signal including the signal of the even channel to the optical coupler 114b from the output ports whose port numbers are from N+1 to 2N.

In this example embodiment, the WSS 117 performs, besides band division and block of unwanted signals, separation of odd channels and even channels. By allowing the WSS 117 to have a function of an interleaver, there is no need to additionally provide an interleaver. The other effects are similar to those in the first example embodiment.

While the present disclosure has been described with reference to the example embodiments, the present disclosure is not limited to the aforementioned example embodiments. Various changes that can be understood by those skilled in the art can be made to the configurations and the details of the present disclosure within the scope of the present disclosure.

In each of the above example embodiments, the processing executed in the controller 116 may be achieved using a computer system including an Application Specific Integrated Circuit (ASIC), a Digital Signal Processor (DSP), a Micro Processing Unit (MPU), a Central Processing Unit (CPU) included in the multiplexing/demultiplexing device 110, or a combination thereof. Specifically, the function of the controller 116 may be achieved by causing the computer system to execute a program including instructions regarding processing such as calculation of the boundary frequency of band division performed by the wavelength selection switches, determination of the cutoff signal band and the like.

In the aforementioned examples, the program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

REFERENCE SIGNS LIST

10 OPTICAL DEMULTIPLEXING DEVICE
11 BRANCH MEANS (FIRST BRANCH MEANS)
12 BAND DIVISION MEANS
13A, 13B MULTIPLEXING MEANS
14A, 14B BRANCH MEANS
15 CONTROL MEANS
20 OPTICAL RECEIVER
100 OPTICAL COMMUNICATION SYSTEM
110 MULTIPLEXING/DEMULTIPLEXING DEVICE
111 OPTICAL COUPLER
112 INTERLEAVER
113A, 113B WAVELENGTH SELECTIVE SWITCH (WSS)
114A, 114B OPTICAL COUPLER
115A, 115B OPTICAL COUPLER
116 CONTROLLER
120 TRANSCEIVER
130 MONITORING DEVICE
140 OPTICAL FIBER
150 OPTICAL SUBMARINE REPEATER
160 OPTICAL SUBMARINE BRANCH DEVICE

The invention claimed is:

1. An optical demultiplexing device comprising:
a first optical coupler configured to branch an optical signal in which signals having a plurality of wavelength intervals different from one another are multiplexed by the number of wavelength intervals;
a plurality of band division units arranged so as to correspond to each of the plurality of wavelength intervals, the plurality of band division units generating, for each of the wavelength intervals, a band division signal in which a signal band of an optical signal branched by the first optical coupler is divided by a predetermined bandwidth and an odd channel and an even channel are separated from each other in each of the wavelength intervals;
a plurality of multiplexing units arranged, for each of the signal bands that have been divided, so as to correspond to the odd channel and the even channel, the plurality of multiplexing units multiplexing, for each of the signal bands that have been divided, the band division signals, output from the band division units, including odd channels of the respective wavelength intervals, and multiplexing, for each of the signal bands that have been divided, the band division signals including the even channels of the respective wavelength intervals;
a plurality of second optical couplers arranged, for each of the signal bands that have been divided, so as to correspond to the odd channel and the even channel, the plurality of second optical couplers branching each of a multiplexed signal including odd channels of the respective wavelength intervals multiplexed by using each of the multiplexing units and a multiplexed signal including even channels of the respective wavelength intervals into a plurality of communication devices; and
a controller configured to control the band division units,
wherein each of the plurality of band division units includes a wavelength selective switch, and
wherein the controller controls the wavelength selective switch based on information indicating a signal arrangement of the signals in the respective wavelength intervals in the optical signal, causes the wavelength selective switch to output a signal of a wavelength band in which a signal of a corresponding wavelength interval is present to the multiplexing units, and causes the wavelength selective switch to cut off a signal of a wavelength band in which a signal of the corresponding wavelength interval is not present.

2. The optical demultiplexing device according to claim 1, wherein each of the plurality of band division units further includes an interleaver separating the odd channel and the even channel in each of the wavelength intervals.

3. The optical demultiplexing device according to claim 2, wherein each of the plurality of band division units includes first and second wavelength selective switches, the first wavelength selective switch dividing an optical signal including the odd channels separated using the interleaver by the predetermined bandwidth, and the second wavelength selective switch dividing an optical signal including the even channels separated using the interleaver by the predetermined bandwidth.

4. The optical demultiplexing device according to claim 3, wherein the first and second wavelength selective switches included in each of the plurality of band division units respectively comprise a first port optically coupled to an output of the interleaver and second ports that correspond to the number of signal bands to be divided.

5. The optical demultiplexing device according to claim 1, wherein the wavelength selective switch included in each of the plurality of the band division units also functions as an interleaver that separates the odd channel and the even channel.

6. The optical demultiplexing device according to claim 5, wherein each of the plurality of wavelength selective switches comprises a first port optically coupled to an output of the first optical coupler, second ports the number of which corresponds to the number of signal bands to be divided, and third ports the number of which corresponds to the number of signal bands to be divided, the plurality of wavelength selective switches outputting, from each of the second ports, an optical signal having a wavelength that corresponds to the odd channel, the optical signal having been divided by the predetermined bandwidth, and the plurality of wavelength selective switches outputting, from each of the third ports, an optical signal having a wavelength that corresponds to the even channel, the optical signal having been divided by the predetermined bandwidth.

7. The optical demultiplexing device according to claim 1, wherein the wavelength selective switch included in each of the plurality of band division units divides the optical signal into signal bands whose boundary wavelength is a wavelength in which a signal is not present in each of the signals in which the odd channels and the even channels in the respective wavelength intervals are separated from each other.

8. An optical signal reception device comprising:
  a first optical coupler configured to branch an optical signal in which signals having a plurality of wavelength intervals different from one another are multiplexed by the number of wavelength intervals;
  a plurality of band division units arranged so as to correspond to each of the plurality of wavelength intervals, the plurality of band division units generating, for each of the wavelength intervals, a band division signal in which a signal band of an optical signal branched by the first optical coupler is divided by a predetermined bandwidth and an odd channel and an even channel are separated from each other in each of the wavelength intervals;
  a plurality of multiplexing units arranged, for each of the signal bands that have been divided, so as to correspond to the odd channel and the even channel, the plurality of multiplexing units multiplexing, for each of the signal bands that have been divided, the band division signals, output from the band division units, including odd channels of the respective wavelength intervals, and multiplexing, for each of the signal bands that have been divided, the band division signals including the even channels of the respective wavelength intervals;
  a plurality of second optical couplers arranged, for each of the signal bands that have been divided, so as to correspond to the odd channel and the even channel, the plurality of second optical couplers branching each of a multiplexed signal including odd channels of the respective wavelength intervals multiplexed by using each of the multiplexing units and a multiplexed signal including even channels of the respective wavelength intervals into a plurality of communication devices;
  a controller configured to control the band division means; and
  an optical receiver configured to receive the multiplexed signals branched by the second optical coupler,
  wherein each of the plurality of band division units includes a wavelength selective switch, and
  wherein the controller controls the wavelength selective switch based on information indicating a signal arrangement of the signals in the respective wavelength intervals in the optical signal, causes the wavelength selective switch to output a signal of a wavelength band in which a signal of a corresponding wavelength interval is present to be output to the multiplexing units, and causes the wavelength selective switch to cut off a signal of a wavelength band in which a signal of the corresponding wavelength interval is not present.

9. An optical demultiplexing method comprising:
  branching an optical signal in which signals having a plurality of wavelength intervals different from one another are multiplexed by the number of wavelength intervals;
  generating, for each of the optical signals that have been branched, a band division signal in which a signal band of an optical signal that has been branched is divided by a predetermined bandwidth and an odd channel and an even channel are separated from each other in each of the wavelength intervals;
  multiplexing, for each of the signal bands that have been divided, a band division signals including odd channels of the respective wavelength intervals;
  multiplexing, for each of the signal bands that have been divided, a band division signals including even channels of the respective wavelength intervals; and
  branching each of a multiplexed signal including odd channels of the respective wavelength intervals multiplexed and a multiplexed signal including even channels of the respective wavelength intervals into a plurality of communication devices, wherein when the band division signal is generated, a wavelength selective switch is controlled based on information indicating a signal arrangement of the signals in the respective wavelength intervals in the optical signal, thereby causing a signal of a wavelength band in which a signal of a corresponding wavelength interval is present to be included in the band division signal, and causing a signal of a wavelength band in which a signal of the corresponding wavelength interval is not present to be cut off by the wavelength selective switch.

* * * * *